B. F. Sherman,
Grain Conveyer.
N°70,126.          Patented Oct. 22, 1867.
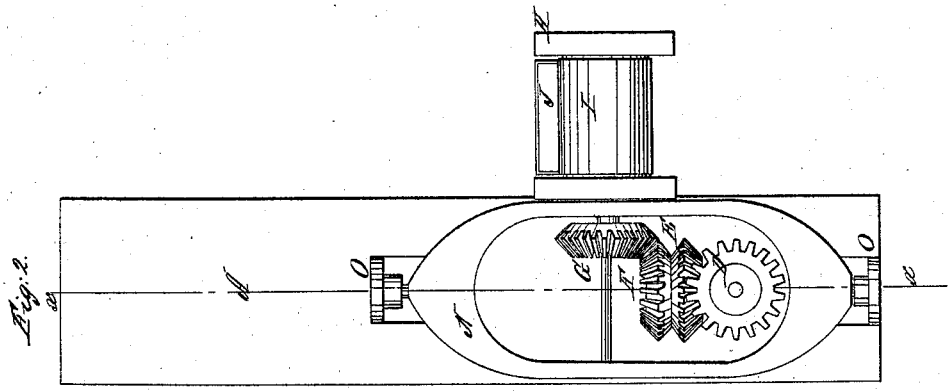
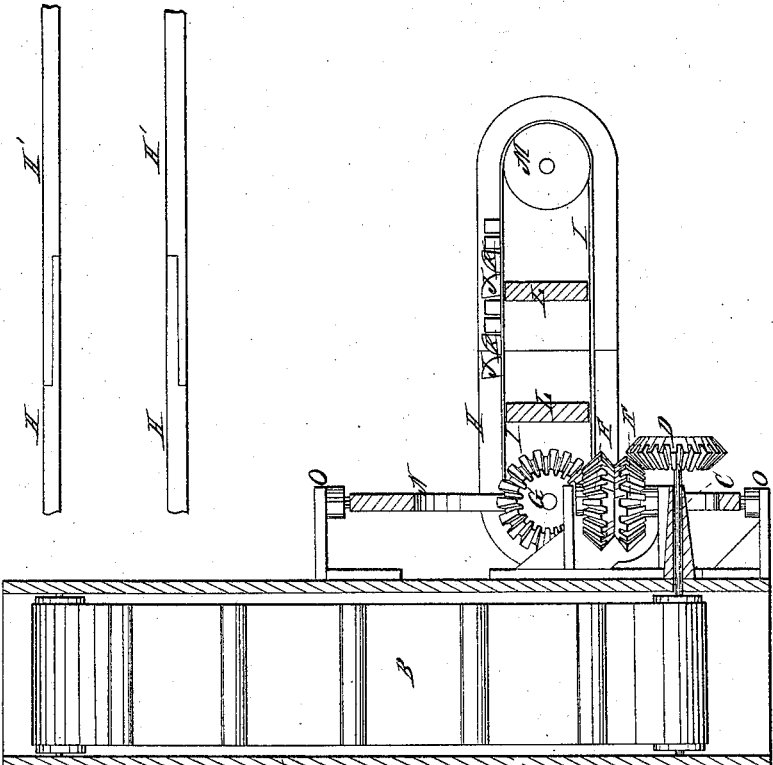

United States Patent Office.

BENJAMIN FRANKLIN SHERMAN, OF SAN FRANCISCO, CALIFORNIA.

Letters Patent No. 70,126, dated October 22, 1867.

---

IMPROVED GRAIN-ELEVATOR AND FEEDER.

---

*The Schedule referred to in these Letters Patent and making part of the same.*

---

TO ALL WHOM IT MAY CONCERN:

Be it known that I, BENJAMIN FRANKLIN SHERMAN, of San Francisco city, San Francisco county, State of California, have invented a new and improved "Grain-Elevator Feeder;" and I do hereby declare the following description and accompanying drawings are sufficient to enable any person skilled in the art or science to which it most nearly appertains to make and use my said invention without further invention or experiment.

The nature of my invention is to provide a feeder to the common grain-elevator, so arranged that when the grain is removed by it, by the use of my feeder a sufficient quantity may be brought within easy reach of the common elevator without the aid of man-power; also so constructed that it may be lengthened and extended to any part of the storehouse or vessel.

For the accomplishment of my object, I attach to the common elevator-case, by means of brackets, a yoke. Through this yoke is placed a shaft, to which, by means of bevel-gearing, is connected the elevator and my improvement, both being driven by the same power. Adjustable extension-pieces, for lengthening or shortening the feeder, are placed along each side of the case, and may be taken out and put in at pleasure. Referring to the drawings—

Figure 1 is a sectional elevation of an elevator, with my improved feeder attached.

Figure 2 is a front elevation of the feeder, showing its attachment to an elevator.

A represents a common elevator, showing the band B stretched over a wheel, through which a shaft, C, passes, and to which the bevel-wheel D is keyed, operating the bevel-gearing E F G. The bevel-wheel G is keyed to a shaft which passes through a yoke attached to the case A, and also through the head of the feeder-case H, over which the elevator-band I passes. The cups J K are of double construction, placed back to back upon the band or belt, to prevent the grain from falling back again after it has been taken up; also side pieces are placed between each series of cups, for the same purpose. L L are supports, to prevent the elevator-band, which is stretched around the wheel M and wheel on the shaft G, from sinking down when loaded. N is a yoke-frame, attached to the elevator-case A by means of brackets O O, which allows the feeder to swing backward and forward, describing the arc of a circle. This device may be placed on both sides of the case A, and the feeder changed from one to the other, as desired.

For the purpose of lengthening and extending my feeder to remote parts of the vessel or storehouse, in case the grain in the immediate vicinity has been taken up, I employ extension-pieces H' and H', of any desired length, upon each side of the case H, by means of lap-joints and screws, or any other device. The elevator-band, of course, is to be lengthened or shortened, as the case may be, when the pieces are added or taken out. For throwing the feeder in and out of gear a clutch may be placed on the shaft G.

By this means the grain is reached in all parts of the vessel without the necessity of shovelling, in order to keep the main elevator supplied. In case of necessity, the main elevator may be placed at an incline, as where the vessel does not lie close to the wharf.

In operating my machine, motion is imparted to it from the main elevator by means of the shaft C, upon which is the bevel-wheel D, communicating with the gearing E F, and transmitting power to the shaft G, around the drum of which and the wheel M is placed the feeder-band I, and to which the cups are attached, which constantly take up the grain and carry it to the main elevator.

It will readily be seen that much time and expense will be saved in discharging ships, as well as emptying storehouses, by the use of my supply-feeder, as no shovelling will be required, and the same power which drives the main elevator will drive them both.

1. I claim the elevator-feeder described, arranged at the lower end of the elevator, and operated by the gear D on the lower pulley-shaft of the elevating-belt, in combination with the gears E, F, and G, so constructed and arranged that the feeder may be swung around in the arc of a circle, to bring it to the grain to be fed to the elevator.

2. Lengthening or shortening the said feeder, by taking out or putting in the extension-pieces H' and H', substantially as described.

In witness whereof I have hereunto set my hand and seal.

B. F. SHERMAN. [L. S.]

Witnesses:
C. W. M. SMITH,
JAMES J. HARGRAVE.